United States Patent
Oguri et al.

(10) Patent No.: US 12,454,214 B2
(45) Date of Patent: Oct. 28, 2025

(54) AUTONOMOUS DRIVING KIT

(71) Applicant: TOYOTA JIDOSHA KABUSHIKI KAISHA, Toyota (JP)

(72) Inventors: Haruki Oguri, Toyota (JP); Ikuma Suzuki, Okazaki (JP); Hiroki Asao, Kobe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 18/664,477

(22) Filed: May 15, 2024

(65) Prior Publication Data
US 2025/0033558 A1    Jan. 30, 2025

(30) Foreign Application Priority Data
Jul. 24, 2023    (JP) ................. 2023-119919

(51) Int. Cl.
*B60R 16/023*    (2006.01)
*B60Q 1/50*    (2006.01)
*B60Q 1/52*    (2006.01)

(52) U.S. Cl.
CPC ............... *B60Q 1/507* (2022.05); *B60Q 1/52* (2013.01); *B60R 16/023* (2013.01)

(58) Field of Classification Search
CPC ........ B60Q 1/507; B60Q 1/52; B60R 16/023; G05D 1/43; G05D 1/242; G05D 1/243; G05D 1/633; G05D 2105/10
See application file for complete search history.

(56) References Cited

U.S. PATENT DOCUMENTS

| | | | | |
|---|---|---|---|---|
| 11,479,245 | B2* | 10/2022 | Kong | B60W 30/12 |
| 11,964,675 | B2* | 4/2024 | Hiemer | B60W 30/09 |
| 2017/0090476 | A1* | 3/2017 | Letwin | G05D 1/0212 |
| 2019/0299927 | A1 | 10/2019 | Ando | |
| 2021/0237766 | A1* | 8/2021 | Suzuki | B60W 10/10 |

FOREIGN PATENT DOCUMENTS

JP    2019-177808 A    10/2019

* cited by examiner

*Primary Examiner* — Nay Tun
(74) *Attorney, Agent, or Firm* — SoraIP, Inc.

(57) ABSTRACT

ADK includes a computer and a communication module. VP includes a non-redundant control system that performs a non-redundant control function, a first bus, a second bus, a first VCIB that is configured to be communicable with the communication module via the first bus and provides a control instruction to the non-redundant control system in accordance with a non-redundant control command for controlling the non-redundant control system from ADK, a second VCIB that is configured to be communicable with the communication module via the second bus, and a third bus that connects the first VCIB and the second VCIB. When the communication via the first bus is abnormal, the computer controls the communication module to send a non-redundant control command to the first VCIB via the second bus and the third bus.

4 Claims, 4 Drawing Sheets

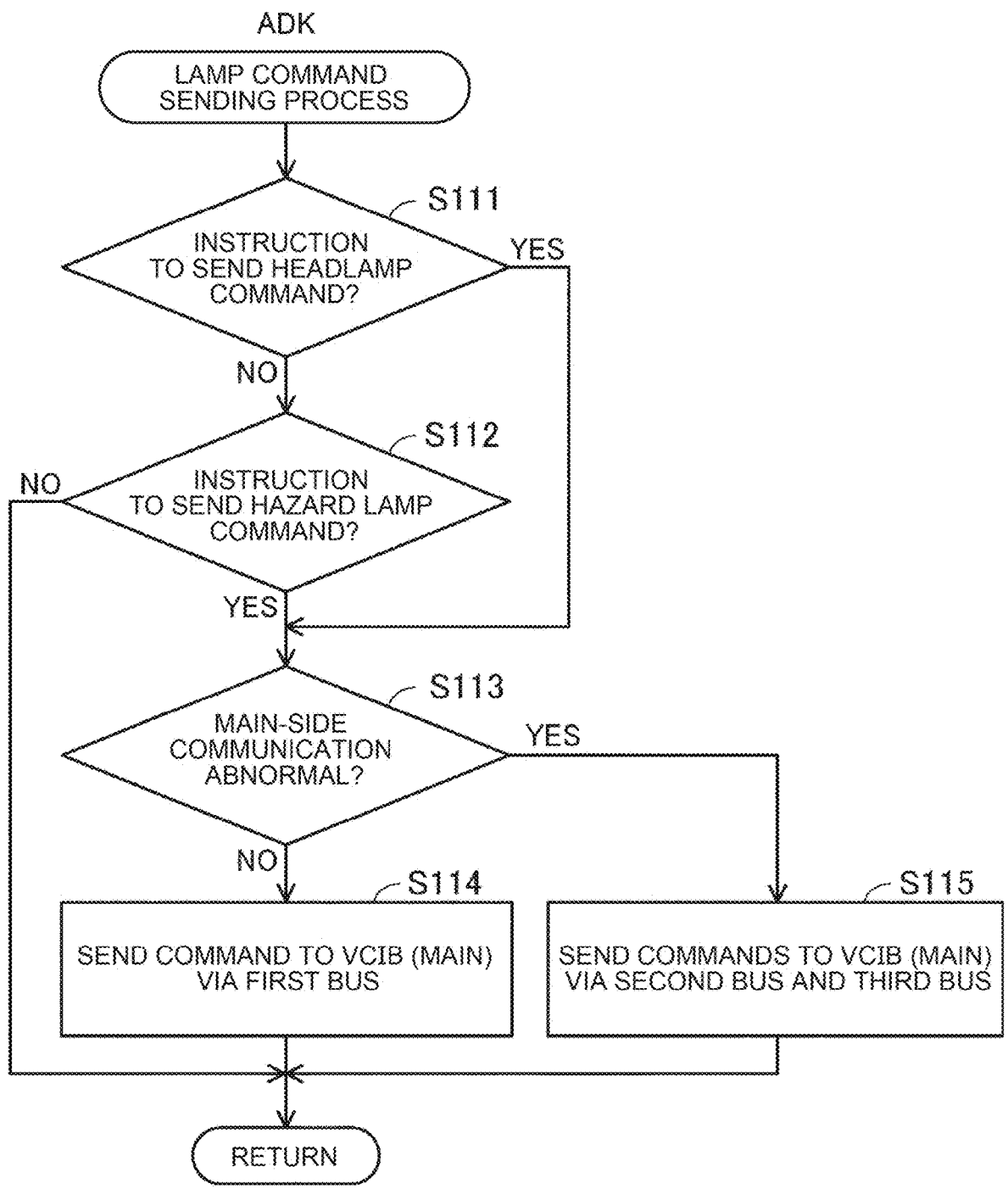

though a vehicle and an autonomous driving kit cooperate to perform autonomous driving (e.g., Japanese Unexamined Patent Application Publication No. 2019-177808 (JP 2019-177808 A)).

AUTONOMOUS DRIVING KIT

CROSS-REFERENCE TO RELATED APPLICATION

This application claims priority to Japanese Patent Application No. 2023-119919 filed on Jul. 24, 2023, incorporated herein by reference in its entirety.

BACKGROUND

1. Technical Field

The present disclosure relates to autonomous driving kits, and more particularly to an autonomous driving kit that is attachable to and detachable from a vehicle platform configured to perform autonomous driving and that sends instructions for autonomous driving.

2. Description of Related Art

Conventionally, there has been systems in which a vehicle and an autonomous driving kit cooperate to perform autonomous driving (e.g., Japanese Unexamined Patent Application Publication No. 2019-177808 (JP 2019-177808 A)).

SUMMARY

It is conceivable to duplicate a system for communication between a vehicle and an autonomous driving kit for redundancy for control of traveling, steering, and braking of a vehicle. In such a configuration, for body control such as headlamp control and hazard lamp control, it is conceivable not to duplicate a system and perform non-redundant control in order to reduce the communication load. In such a case, if an abnormality occurs in communication from the autonomous driving kit to the vehicle for the body control, control commands cannot be sent from the autonomous driving kit to the vehicle.

The present disclosure was made to solve the above issue, and it is an object of the present disclosure to provide an autonomous driving kit that can perform non-redundant control when communication for the non-redundant control is abnormal in a configuration that can perform redundant control.

An autonomous driving kit according to the present disclosure is attachable to and detachable from a vehicle platform configured to perform autonomous driving and sends an instruction for the autonomous driving.

The autonomous driving kit includes:
a processor;
a first communication module; and
a second communication module.
The vehicle platform includes
a non-redundant control system that performs a non-redundant control function of the vehicle platform,
a first bus,
a second bus,
a first vehicle control interface box that is configured to communicate with the first communication module via the first bus, and that sends a control instruction to the non-redundant control system according to a non-redundant control command, the non-redundant control command being a command from the autonomous driving kit to control the non-redundant control system, a second vehicle control interface box configured to communicate with the second communication module via the second bus, and
a third bus connecting the first vehicle control interface box and the second vehicle control interface box.

When communication via the first bus is abnormal, the processor controls the second communication module to send the non-redundant control command to the first vehicle control interface box via the second bus and the third bus.

According to such a configuration, when communication via the first bus used to send the non-redundant control command from the processor of the autonomous driving kit to the first vehicle control interface box during normal operation is abnormal, the non-redundant control command is sent from the processor to the first vehicle control interface box via the second bus, the second vehicle control interface box, and the third bus. Accordingly, it is possible to provide an autonomous driving kit that can perform non-redundant control when communication for the non-redundant control is abnormal in a configuration that can perform redundant control.

When communication via the first bus is not abnormal, the processor may control the first communication module to send the non-redundant control command to the first vehicle control interface box via the first bus. According to such a configuration, it is possible to efficiently send the non-redundant control command in a short path during normal operation.

The vehicle platform may further include a redundant control system that performs a redundant control function different from the non-redundant control function of the vehicle platform.

The processor may control the first communication module to send a redundant control command to control the redundant control function to the first vehicle control interface box via the first bus, and may control the second communication module to send the redundant control command to the second vehicle control interface box via the second bus. According to such a configuration, it is possible to send the redundant control command from the autonomous driving kit to the vehicle platform by using duplicated systems.

The non-redundant control function may be a headlamp function or a hazard lamp function. According to such a configuration, it is possible to control the headlamp function or the hazard lamp function when communication for controlling the headlamp function or the hazard lamp function is abnormal in a configuration configured to perform redundant control.

According to the present disclosure, it is possible to provide an autonomous driving kit that can perform non-redundant control when communication for the non-redundant control is abnormal in a configuration that can perform redundant control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flow chart showing a flow of a ramp command sending process executed by ADK in this embodiment.

DETAILED DESCRIPTION OF EMBODIMENTS

Figure 1:
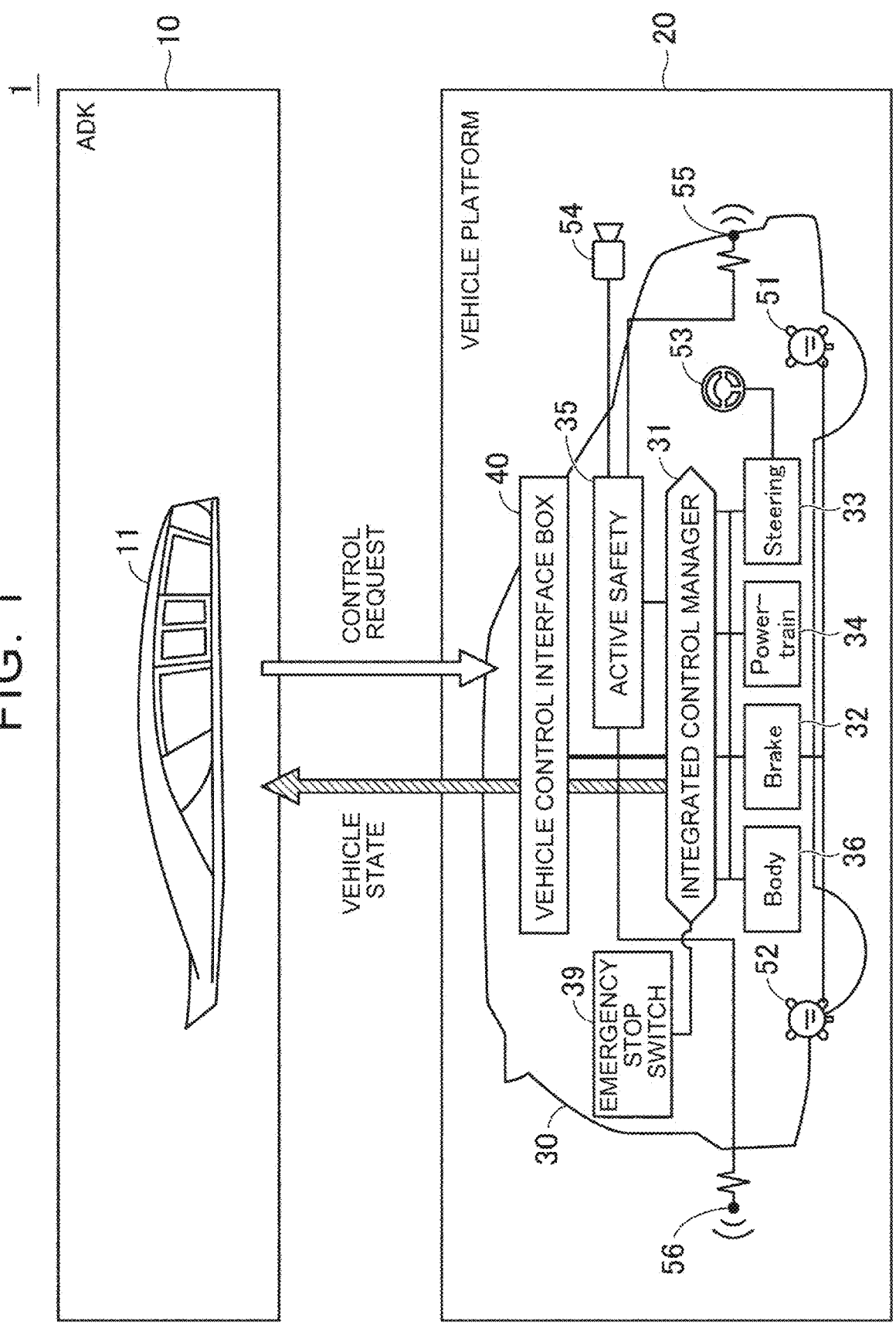
FIG. 1 is a diagram illustrating an outline of a vehicle according to an embodiment of the present disclosure.

FIG. 1 is a diagram illustrating an outline of a vehicle 1 according to an embodiment of the present disclosure. The vehicle 1 includes an Autonomous Driving Kit (ADK) 10 and a Vehicle Platform (VP) 20. ADK 10 is configured to be attachable to VP 20 (mountable to the vehicles 1). ADK 10 and VP 20 are configured to be able to communicate with each other via a vehicle-control interface (a VCIB 40 described later).

VP 20 can perform autonomous driving in accordance with control demands from ADK 10. In FIG. 1, although ADK 10 is shown at a position away from VP 20, ADK 10 is actually attached to a rooftop or the like of VP 20. ADK 10 can also be removed from VP 20. When ADK 10 is removed, VP 20 performs travel control (travel control according to user manipulation) in the manual mode.

ADK 10 includes an Autonomous Driving System (ADS) 11 for performing automated driving of the vehicles 1. ADS 11 creates, for example, a travel plan of the vehicles 1. ADS 11 outputs various control requests for causing the vehicle 1 to travel in accordance with the travel plan to VP 20 in accordance with an Application Program Interface (API) defined for each control request. Further, ADS 11 receives various signals indicating the vehicle state (VP 20 state) from VP 20 according to a API defined for each signal. Then, ADS 11 reflects the condition of the vehicle in the travel plan.

VP 20 includes a base-vehicle 30 and a Vehicle Control Interface Box (VCIB) 40. The base vehicle 30 executes various types of vehicle control in accordance with control demands from ADK 10 (ADS 11). The base vehicle 30 includes various systems and various sensors for controlling the base vehicle 30. More specifically, the base vehicle 30 includes an integrated control manager 31, a brake system 32, a steering system 33, a powertrain system 34, an active safety system 35, a body system 36, wheel speed sensors 51 and 52, a pinion angle sensor 53, a camera 54, and radar sensors 55 and 56.

The integrated control manager 31 includes a processor and a memory, and integrates and controls the respective systems (the brake system 32, the steering system 33, the powertrain system 34, the active safety system 35, and the body system 36) related to the operation of the vehicle 1.

The brake system 32 is configured to control a braking device provided on each wheel of the base vehicle 30. The wheel speed sensors 51 and 52 are connected to the brake system 32. The wheel speed sensors 51 and 52 detect the rotational speeds of the front and rear wheels of the base vehicle 30, respectively, and output the detected rotational speeds to the brake system 32. The brake system 32 outputs the rotational speed of the wheels to VCIB 40 as one of the information included in the vehicle state. In addition, the brake system 32 generates a braking command for the braking device in accordance with a predetermined control demand outputted from ADS 11 via VCIB 40 and the integrated control manager 31. The brake system 32 controls the braking device using the generated braking command.

The steering system 33 is configured to be able to control the steering angle of the steered wheels of the vehicle 1 by using a steering device. A pinion angle sensor 53 is connected to the steering system 33. The pinion angle sensor 53 detects a rotation angle (pinion angle) of the pinion gear connected to the rotation shaft of the actuator, and outputs the detected rotation angle to the steering system 33. The steering system 33 outputs the pinion angle to VCIB 40 as one of information included in the vehicle status. In addition, the steering system 33 generates a steering command for the steering device in accordance with a predetermined control request outputted from ADS 11 via VCIB 40 and the integrated control manager 31. The steering system 33 controls the steering device by using the 20 generated steering command.

The powertrain system 34 controls an Electric Parking Brake (EPB) system 341 on at least one of a plurality of wheels, a P-Lock system 342 on a transmission of the vehicle 1, and a propulsion system 343 including a shifting device configured to select a shift range.

The active safety system 35 uses the camera 54 and the radar sensors 55 and 56 to detect obstacles (pedestrians, bicycles, parked vehicles, utility poles, and the like) in the front or rear. The active safety system 35 determines whether the vehicle 1 is likely to collide with an obstacle based on the distance between the vehicle 1 and the obstacle and the moving direction of the vehicle 1. When the active safety system 35 determines that there is a possibility of a collision, it outputs a braking command to the brake system 32 via the integrated control manager 31 so that the braking force increases.

The body system 36 is configured to control components such as a direction indicator (a turn lamp, a hazard lamp), a horn, a wiper, a headlamp, and a brake lamp according to, for example, a traveling state or an environment of the vehicle 1. The body system 36 controls the above-described components according to predetermined control requirements outputted from ADS 11 via VCIB 40 and the integrated control manager 31.

VCIB 40 is configured to be able to communicate with ADS 11 through Controller Area Network (CAN) or the like. VCIB 40 executes a predetermined API defined for each signal, and thereby receives various control requests from ADS 11 and outputs the vehicle status to ADS 11. When receiving the control request from ADK 10, VCIB 40 outputs a control command corresponding to the control request to the control command via the integrated control manager 31. Further, VCIB 40 acquires various types of information of the base vehicle 30 from various systems via the integrated control manager 31, and outputs the state of the base vehicle 30 as a vehicle state to ADS 11.

The base vehicle 30 further includes an emergency stop switch 39. The emergency stop switch 39 is provided so as to be operable by the driver of the vehicle 1, and when operated, outputs a signal indicating that the vehicle has been operated to the integrated control manager 31.

Figure 2:
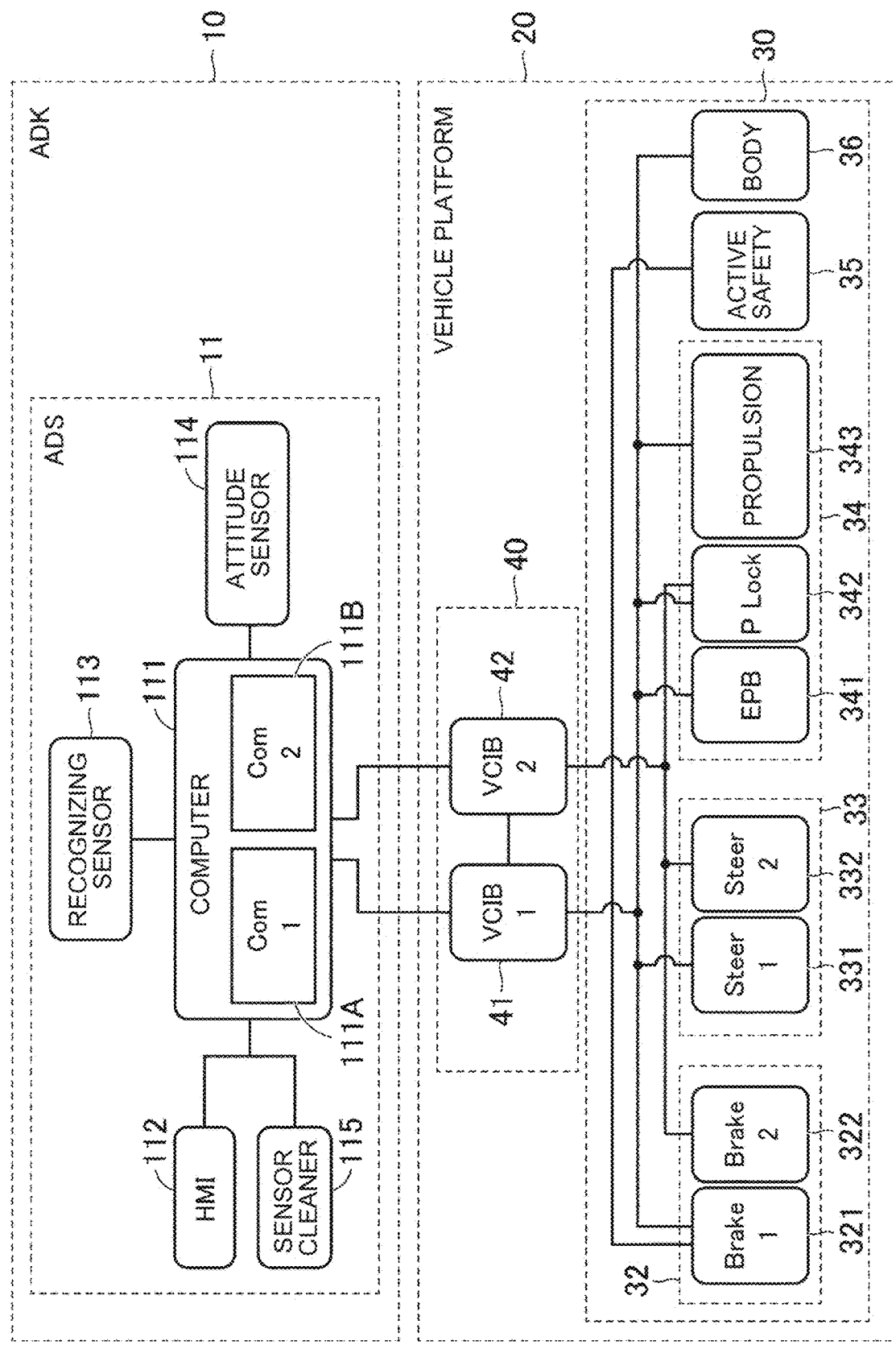
FIG. 2 is a more detailed view of the configuration of ADS, VCIB and VP.

FIG. 2 is a diagram illustrating a configuration of a ADS 11, VCIB 40 and a VP 20 in more detail. As illustrated in FIG. 2, ADS 11 includes a computer 111, a Human Machine Interface (HMI) 112, a recognizing sensor 113, an attitude sensor 114, and a sensor cleaner 115.

Computer 111 includes a processor such as Central Processing Unit (CPU) and memories such as Read Only Memory (ROM) and Random Access Memory (RAM). The computer 111 acquires the environment of the vehicle 1, the attitude, the behavior, and the position of the vehicle 1 using various sensors during autonomous driving of the vehicle 1, and acquires the vehicle state from VP 20 through VCIB 40 to set a subsequent operation (acceleration, deceleration, bending, and the like) of the vehicle 1. The computer 111 outputs various commands for realizing the following operations to VCIB 40. The computer 111 includes a communications modular 111A,111B. Each of the communication modular 111A, 111B is configured to be capable of communicating with a VCIB 40.

HMI 112 presents information to the user or accepts a user operation at the time of autonomous driving, driving requiring a user operation, transitioning between autonomous driving and driving requiring a user operation, and the like.

The recognizing sensor 113 is a sensor for recognizing the environment of the vehicle 1. The recognizing sensor 113 includes at least one of a Laser Imaging Detection and Ranging (LIDAR), a millimeter-wave radar, and a camera.

The attitude sensor 114 is a sensor for detecting the attitude, behavior, and position of the vehicle 1. The attitude sensor 114 includes, for example, Inertial Measurement Unit (IMU) and Global Positioning System (GPS). The sensor cleaner 115 is configured to remove dirt adhering to the various sensors (a lens of a camera, an irradiation unit of a laser beam, or the like) while the vehicle 1 is traveling by using a cleaning liquid, a wiper, or the like.

VCIB 40 includes a main VCIB 41 and a sub VCIB 42. Each of VCIB 41,42 includes a processor such as Central Processing Unit (CPU) and memories such as Read Only Memory (ROM) and Random Access Memory (RAM). The memory stores a program executable by the processor. VCIB 41 and the communication modular 111A are communicably connected to each other. VCIB 42 and the communication modular 111B are communicably connected to each other. Further, VCIB 41 and VCIB 42 are communicably connected to each other.

Each of VCIB 41,42 relays control requirements and vehicle-information between ADS 11 and VP 20. More specifically, VCIB 41 uses API to generate a control command from a control demand from ADS 11. Then, VCIB 41 outputs the generated control command to the corresponding system among the plurality of systems included in VP 20. VCIB 41 uses API to generate information indicating the vehicle status from the vehicle information from the respective systems of VP 20. VCIB 41 outputs the generated information indicating the vehicle-state to ADS 11. The same applies to VCIB 42.

EPB device 341 controls EPB according to a control request outputted from ADS 11 via VCIB 41. EPB is provided separately from the braking device (e.g., disc brake system) and fixes the wheels by operation of the actuator.

P-Lock system 342 controls ADS 11 according to a control request outputted from VCIB 41. P-Lock system 342 activates P-Lock device, for example, if the control request includes a control request that puts the shift range in the parking range (P range), and deactivates P-Lock device if the control request includes a control request that puts the shift range other than the P range. P-Lock device fixes the rotation of the output shaft of the transmission and fixes the wheels.

The propulsion system 343 switches a shift range of the shifting device and controls a driving force from a driving source (motor generator, engine, or the like) in accordance with a control request outputted from ADS 11 via VCIB 41.

In the vehicle 1, for example, the autonomous driving is executed when a later-described autonomous driving mode is selected in response to a request from ADK 10. As described above, ADS 11 first creates a travel plan during autonomous driving. Examples of the travel plan include a plan for continuing straight travel, a plan for turning left/right at a predetermined intersection in the middle of a predetermined travel route, a plan for changing a travel lane, and the like. ADS 11 calculates a control physical quantity (acceleration, deceleration, tire-out angle, and the like) required for the vehicle 1 to operate in accordance with the created travel plan. ADS 11 divides the physical quantity for each API run cycle. ADS 11 uses API to provide control demands to VCIB 40 that represent the divided physical quantities. Further, ADS 11 acquires a vehicle state (an actual moving direction of the vehicle 1, a state of fixing of the vehicle, and the like) from VP 20, and re-creates a travel plan reflecting the acquired vehicle state. In this way, ADS 11 enables autonomous driving of the vehicles 1.

In the above configuration, communication between VP 20 and ADK 10 is duplicated for redundancy for control of traveling, steering, and braking of the vehicle 1. In such a configuration, it is conceivable that the body control, such as the control of the headlamps and the hazard lamps of the body system 36, is performed in a non-redundant manner without duplicating a system in order to reduce the communication load. In such cases, if an error occurs in the communication of the body control from ADK 10 to VP 20, the control command from ADK 10 cannot be transmitted to VP 20.

Therefore, VP 20 includes a first bus 411 that connects ADK 10 communication module 111A and the main VCIB 41, a second bus 412 that connects ADK 10 communication module 111B and the sub VCIB 42, and a third bus 401 that connects VCIB 41 and VCIB 42. When communication via the first bus 411 is abnormal, ADK 10 computer 111 controls the communication module 111B to send non-redundant control commands to VCIB 41 via the second bus 412 and the third bus 401.

Thus, when the communication through the first bus 411 used to send the non-redundant control command from the computer 111 of ADK 10 to VCIB 41 in the normal state is abnormal, the non-redundant control command is sent from the computer 111 to VCIB 41 through the second bus 412, VCIB 42, and the third bus 401. As a result, in a configuration in which redundant control is possible, non-redundant control can be executed when communication for non-redundant control is abnormal.

Figure 3:
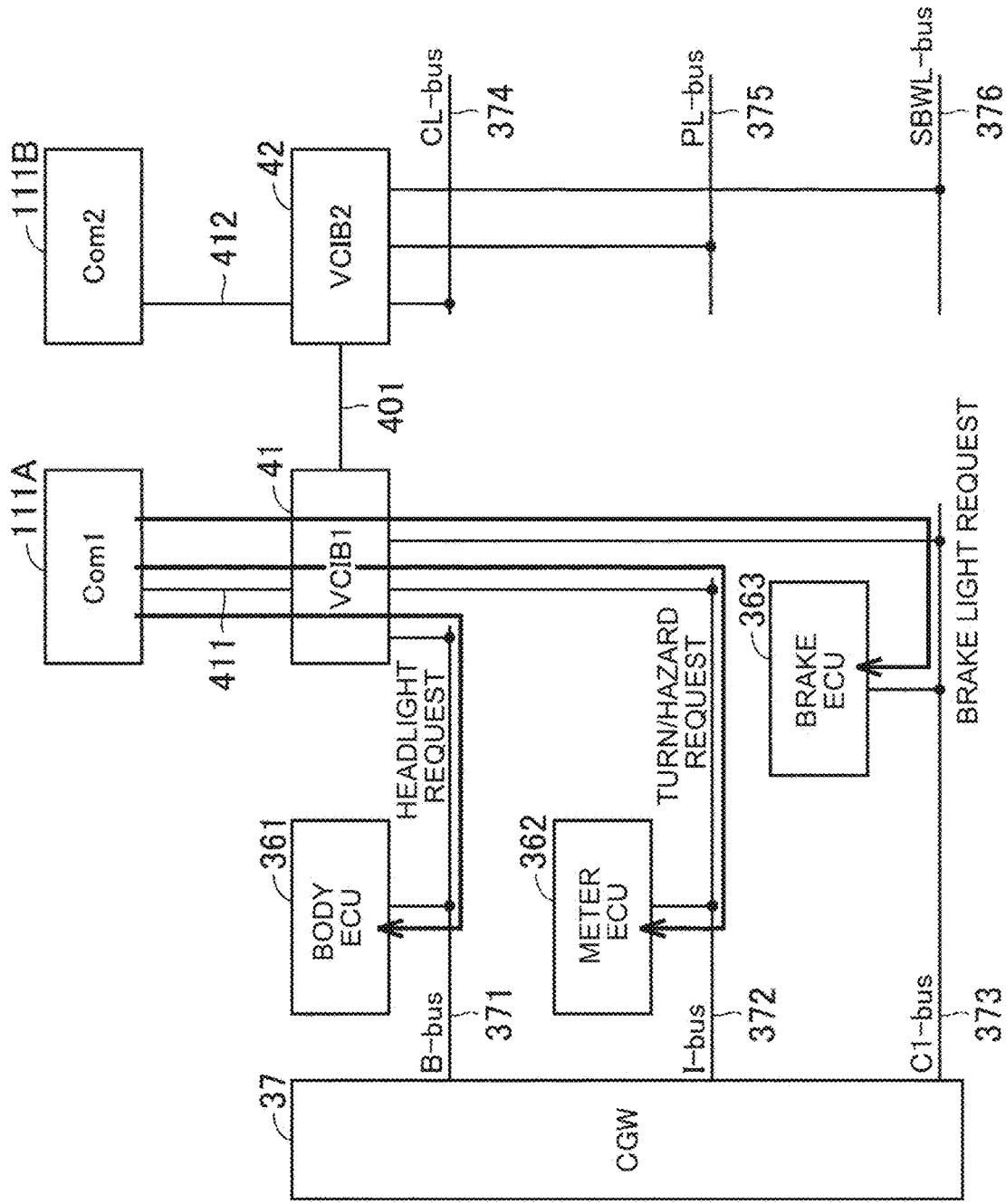
FIG. 3 is a diagram for explaining communication in body control.

FIG. 3 is a diagram for explaining communication in body control. Referring to FIG. 3, a first bus 411 communicatively connects a communication module 111A of a ADK 10 and a main VCIB 41. The second bus 412 communicatively connects ADK 10 communication module 111B and the sub VCIB 42. The third bus 401 communicatively connect the main VCIB 41 and the sub VCIB 42.

B-bus 371 communicatively connects the main VCIB 41, the body Electronic Control Unit (ECU) 361, and the central gateway (hereinafter referred to as "CGW") 37. I-bus 372 communicatively connects the main VCIB 41, the meter ECU 362, and CGW 37. C1-bus 373 communicatively connects the main VCIB 41, the brake ECU 363, and CGW 37.

VP 20 comprises, in addition to B-bus 371, I-bus 372 and C1-bus 373, other communication buses (e.g., CL-bus 374, PL-bus 375 and SBWL-bus 376 connected to sub-networks of VCIB 42, etc.). These other communication busses are not connected to the body ECU 361, the meter ECU 362 and the brake ECU 363.

The body ECU 361 receives, from ADK 10, control commands of, for example, horns, wipers, and headlamps of the body system 36 through the communication module 111A, the first bus 411, the main VCIB 41, and B-bus 371. The body ECU 361 controls the horn, wiper and headlamp devices according to control commands. For example, the body ECU 361 lights the headlamp with a high beam, lights the headlamp with a low beam, or turns off the headlamp.

The meter ECU 362 receives, from ADK 10, a control command of a directional indicator of the body system 36 through the communication module 111A, the first bus 411, the main VCIB 41 and I-bus 372. The meter ECU 362 controls the direction indicator to function as a turn lamp (only one of the left and right direction indicators blinks) or a hazard lamp (the direction indicators on both sides of the left and right direction indicators blink at the same timing) according to the control command.

The brake ECU 363 receives from ADK 10 a control command for a brake lamp of the body system 36 through the communication module 111A, the first bus 411, the main VCIB 41 and C1-bus 373. The brake ECU 363 turns on or off the brake lamp in accordance with a control command sent from ADK 10 in accordance with the braking control.

The control commands for the redundant control relating to the travel, the steering, and the braking are sent from ADK 10 to the main VCIB 41 via the communication module 111A and the first bus 411, and are also sent to the sub VCIB 42 via the communication module 111B and the second bus 412.

FIG. 4 is a flow chart showing a flow of a ramp command sending process executed by ADK 10 in this embodiment. Referring to FIG. 4, the lamp-command sending process is called and executed by ADK 10 computer 111 at predetermined intervals from the higher-order process.

ADK 10 computer 111 determines whether or not an instruction to send a headlamp command has been issued in another process being executed by the computer 111 (S111). If it is determined that an instruction to send a headlamp command has not been issued (NO in S111), the computer 111 determines whether or not an instruction to send a hazard lamp command has been issued in another process being executed by the computer 111 (S112). When it is determined that the instruction to send the hazard ramp command has not been issued (NO in S112), the computer 111 returns the processing to be executed to the processing of the upper level of the caller of this processing.

When it is determined that an instruction to send a headlamp command is issued (YES in S111) and when it is determined that an instruction to send a hazard lamp command is issued (YES in S112), the computer 111 determines whether or not there is an abnormality in the main-side communication (communication between the communication module 111A and the main VCIB 41) (S113). If there is an abnormality in the communication module 111A, an abnormality in the first bus 411, or a communication abnormality with ADK 10 in the main VCIB 41, it is determined that there is an abnormality in the communication on the main side.

If it is determined that there is no abnormality in the main communication (NO in S113), the computer 111 controls (S114) the communication module 111A to send a command to the main VCIB 41 through the first bus 411. After that, the computer 111 returns the processing to be executed to the processing of the upper level of the caller of this processing.

If it is determined that there is an error in the main-side communication (YES in S113), the computer 111 controls (S115) the communication module 111B to send a command to the main VCIB 41 through the second bus 412, the sub VCIB 42, and the third bus 401. After that, the computer 111 returns the processing to be executed to the processing of the upper level of the caller of this processing.

Since the braking command for the braking control is redundant control, it is sent using duplicated systems. Therefore, for the brake lamp in the body system 36, even when the control command of the brake lamp by the main-side communication from ADK 10 cannot be sent, the brake lamp can also be controlled in accordance with the control of the braking based on the braking command.

Modified Examples (1) In the embodiments described above, the above disclosure is applied to the headlamp function and the hazard lamp function as shown in FIGS. 3 and 4. However, the present disclosure is not limited thereto, and unlike the redundant control function controlled by using duplicated systems, the above disclosure can be applied as long as the non-redundant control function is used by using one of the duplicated systems.

(2) In the above-described embodiment, as illustrated in FIG. 3, a control command for non-redundant control in which a system for communication such as control of headlamps and hazard lamps is not duplicated is sent on the main side via the first bus 411. However, the present disclosure is not limited thereto, and a control command for non-redundant control may be sent not on the first bus 411 but on the sub-side via the second bus 412. That is, the non-redundant control may be executed using the communication on the sub-side. The body ECU 361 and the meter ECU 362 are then connected to communication busses on the sides of VCIB 42.

SUMMARY (1) As illustrated in FIG. 1, ADK 10 is attachable to and detachable from a VP 20 configured to be capable of autonomous driving, and issues an instruction for autonomous driving. As shown in FIG. 2, ADK 10 comprises a computer 111, a first communication module 111A and a second communication module 111B. As illustrated in FIGS. 1 to 3, VP 20 includes a non-redundant control system (e.g., a body system 36, a body ECU 361, a meter ECU 362) performing non-redundant control functions of VP 20 (e.g., headlamp functions, hazard lamp functions), a first bus 411, a second bus 412, a first VCIB 41 configured to communicate with the first communication module 111A via a first bus 411 and send a control instruction to a non-redundant control system according to a non-redundant control command from the ADK 10 to control the non-redundant control system, a second VCIB 42 configured to be communicate with a second communication module 111B via a second bus 412, and a third bus 401 connecting the first VCIB 41 and the second VCIB 42. As shown in FIG. 4, when communication via the first bus 411 is abnormal, the computer 111 controls the second communication module 111B to send non-redundant control commands to the first VCIB 41 via the second bus 412 and the third bus 401 (e.g., S115).

Thus, when the communication through the first bus 411 used to send the non-redundant control command from the computer 111 of ADK 10 to the first VCIB 41 at normal time is abnormal, the non-redundant control command is sent from the computer 111 to the first VCIB 41 through the second bus 412, the second VCIB 42, and the third bus 401. As a result, in a configuration in which redundant control is possible, non-redundant control can be executed when communication for non-redundant control is abnormal.

(2) As shown in FIG. 4, the computer 111 may control (e.g., S114) the first communication modular 111A to send non-redundant control commands to the first VCIB 41 via the first bus 411 if the communication via the first bus 411 is not abnormal. Thus, when there is no abnormality, it is possible to efficiently send the non-redundant control command in a short path.

(3) As described in FIG. 3, VP 20 may further include a redundant control system (e.g., a brake system 32, a steering system 33, and a powertrain system 34) that performs redundant control functions (e.g., a braking function, a steering function, and a traveling function) that differ from the non-redundant control functions of VP 20, and the computer 111 may control the first communication module 111A to send redundant control commands (e.g., a braking command, a steering command, and a traveling command) for controlling the redundant control functions to the first VCIB 41 via the first bus 411, and may control the second communication module 111B to send redundant control commands to the second VCIB 42 via the second bus 412. Thus, the redundant control commands can be sent from ADK 10 to VP 20 by using duplicated systems.

(4) As shown in FIGS. 3 and 4, the non-redundant control function may be a headlamp function or a hazard lamp function. Thus, in a configuration in which redundant control is possible, control of the headlamp function or the hazard lamp function can be executed when communication for controlling the headlamp function or the hazard lamp function is abnormal.

The embodiments disclosed herein should be considered to be exemplary and not restrictive in all respects. It is intended that the scope of the disclosure be defined by the appended claims rather than the description of the embodiments described above, and that all changes within the meaning and range of equivalency of the claims be embraced therein.

What is claimed is:

1. An autonomous driving kit that is attachable to and detachable from a vehicle platform configured to perform autonomous driving and that sends an instruction for the autonomous driving, the autonomous driving kit comprising:
    a processor;
    a first communication module; and
    a second communication module, wherein:
    the vehicle platform includes
        a non-redundant control system that performs a non-redundant control function of the vehicle platform,
        a first bus,
        a second bus,
        a first vehicle control interface box that is configured to communicate with the first communication module via the first bus, and that provides a control instruction to the non-redundant control system according to a non-redundant control command, the non-redundant control command being a command from the autonomous driving kit to control the non-redundant control system,
        a second vehicle control interface box configured to communicate with the second communication module via the second bus, and
        a third bus connecting the first vehicle control interface box and the second vehicle control interface box; and
    when communication via the first bus is abnormal, the processor controls the second communication module to send the non-redundant control command to the first vehicle control interface box via the second bus and the third bus.

2. The autonomous driving kit according to claim 1, wherein when communication via the first bus is not abnormal, the processor controls the first communication module to send the non-redundant control command to the first vehicle control interface box via the first bus.

3. The autonomous driving kit according to claim 1, wherein:
    the vehicle platform further includes a redundant control system that performs a redundant control function different from the non-redundant control function of the vehicle platform; and
    the processor controls the first communication module to send a redundant control command to control the redundant control function to the first vehicle control interface box via the first bus, and controls the second communication module to send the redundant control command to the second vehicle control interface box via the second bus.

4. The autonomous driving kit according to claim 1, wherein the non-redundant control function is a headlamp function or a hazard lamp function.

* * * * *